United States Patent [19]

Icking

[11] Patent Number: 4,485,763
[45] Date of Patent: Dec. 4, 1984

[54] METHOD FOR DIRECT MEASUREMENT OF THE AMOUNT OF MILK OBTAINED FROM A COW BY A MILKING SYSTEM DURING MILKING

[75] Inventor: Friedrich Icking, Oelde, Fed. Rep. of Germany

[73] Assignee: Westfalia Separator AG, Oelde, Fed. Rep. of Germany

[21] Appl. No.: 603,974

[22] Filed: Apr. 24, 1984

Related U.S. Application Data

[62] Division of Ser. No. 427,081, Sep. 29, 1982, abandoned.

[30] Foreign Application Priority Data

Oct. 5, 1981 [DE] Fed. Rep. of Germany ....... 3139536

[51] Int. Cl.$^3$ .............................................. A01J 7/00
[52] U.S. Cl. .................................................. 119/14.17
[58] Field of Search .............. 119/14.05, 14.08, 14.14, 119/14.17, 14.46

[56] References Cited

U.S. PATENT DOCUMENTS

| | | | |
|---|---|---|---|
| 3,919,975 | 11/1975 | Duncan | 119/14.05 |
| 4,185,586 | 1/1980 | Flocchini | 119/14.08 |
| 4,372,249 | 2/1983 | Kiestra et al. | 119/14.17 |

*Primary Examiner*—Hugh R. Chamblee
*Attorney, Agent, or Firm*—Sprung, Horn, Kramer & Woods

[57] ABSTRACT

A method for directly measuring the quantity of milk obtained from a cow being milked by a mechanical milking apparatus, including vacuum separating milk from a milk-air mixture from a cow, continuously freely feeding the separated milk to a measuring chamber, sensing the level of the milk to the measuring chamber at a first level from the bottom thereof, discharging the milk from the measuring chamber through a valved outlet by opening same when the level of the milk in the measuring chamber reaches said first level and determining the quantity (Q) of milk from partial volumes during a plurality of measurement intervals ($b_i$) during the flow of milk into and out of the measuring chamber. The improvement comprises sensing the level of the milk in the measuring chamber at a second level below said first level, measuring the time ($c_i$) it takes to fill the measuring chamber, from the second level to the first level, closing the valved outlet when the milk is at the second level and defining each measurement interval ($b_i$) as including at least one filling time ($c_i$) and one segment of the time ($d_i$) during which the valved outlet is open before the filling time ($c_i$) and after the filling time ($c_i$). The step of determining Q comprises calculating Q according to $$Q = V \sum_{i=1}^{n} \frac{b_i}{c_i}$$

where $$b_1 = c_1 + \frac{d_1}{2} \text{ and } b_i = \frac{d_{i-1}}{2} + c_i + \frac{d_i}{2} \text{ for } i = 2, 3, \ldots$$

3 Claims, 6 Drawing Figures

METHOD FOR DIRECT MEASUREMENT OF THE AMOUNT OF MILK OBTAINED FROM A COW BY A MILKING SYSTEM DURING MILKING

This application is a division of application Ser. No. 427,081, filed Sept. 29, 1982, now abandoned.

BACKGROUND OF THE INVENTION

The present invention relates to a milk-flow measuring method to be employed in milking systems for direct measurement during milking of the amount of milk obtained from a cow, with both a vacuum separation compartment in which the milk is separated from the originally obtained mixture of milk and air and, downstream from the separation compartment, a milk-volume measurement compartment that has at least one sensor near the top for measuring the level of milk accumulating in it, a milk outlet in the floor that can be opened and closed in accordance with the level of the milk, and a measuring and counting device for determining the total amount of milk in terms of the sum of the individual portions extracted from the measurement compartment.

Another milk-volume measuring method of the type just described is known from German OS 2 810 376. Its separation compartment communicates with its measurement compartment through a milk inlet that can be opened and closed with a valve. The valve is attached to a control rod that has another valve at the bottom and that can close off the milk outlet in the floor. When the upper valve leaves the milk inlet open, the lower valve closes off the milk outlet and vice versa.

The separation compartment in this device is connected to a low-pressure line. Since, when the device is in operation, vapor from the milk gets into this line, it has to be cleaned.

Since fresh milk has to flow into the separation compartment while the inlet into the measurement compartment is closed, the separation compartment must have a fairly large capacity. A design that employs a control rod and two valves is expensive and results in different pressures in the separation and measurement compartments.

German application No. P 30 20 161.7-52 (corresponding to copending U.S. Pat. No. 4,372,249), specifies a milk-volume meter of the type initially described, but small, without an exterior low-pressure line into the separation compartment, and providing very precise measurements, even though the milk outlet does not have to be calibrated.

SUMMARY OF THE INVENTION

The object of the present invention is to improve the precision of measurement with a method which includes positioning another level sensor below the first sensor, connecting both sensors to a device that measures the time it takes to fill the measurement compartment from the lower to the upper sensor level and to control that open outlet valve when the milk is at the upper level and close it when the milk is at the lower level and providing a device that measures the filling times and a calculating device that calculates the total volume of milk from measurements of the partial volumes, with at least one filling time and at least one segment of the time during which the outlet valve is open being included in the time of one measurement interval and with the end of the measurement interval being shifted with respect to the end of the time during which the outlet valve is open.

Shifting the filling process or processes to the middle of the measurement interval results in even more precise measurements than is possible with the method.

One embodiment of the invention eliminates determining the length of the measurement interval, which is predetermined.

It is also possible, however, to make the length of the measurement interval a function of filling time or even of other parameters.

Some embodiments of the invention will now be specified with reference to the drawings, in which

DETAILED DESCRIPTION OF THE INVENTION

Figure 1:
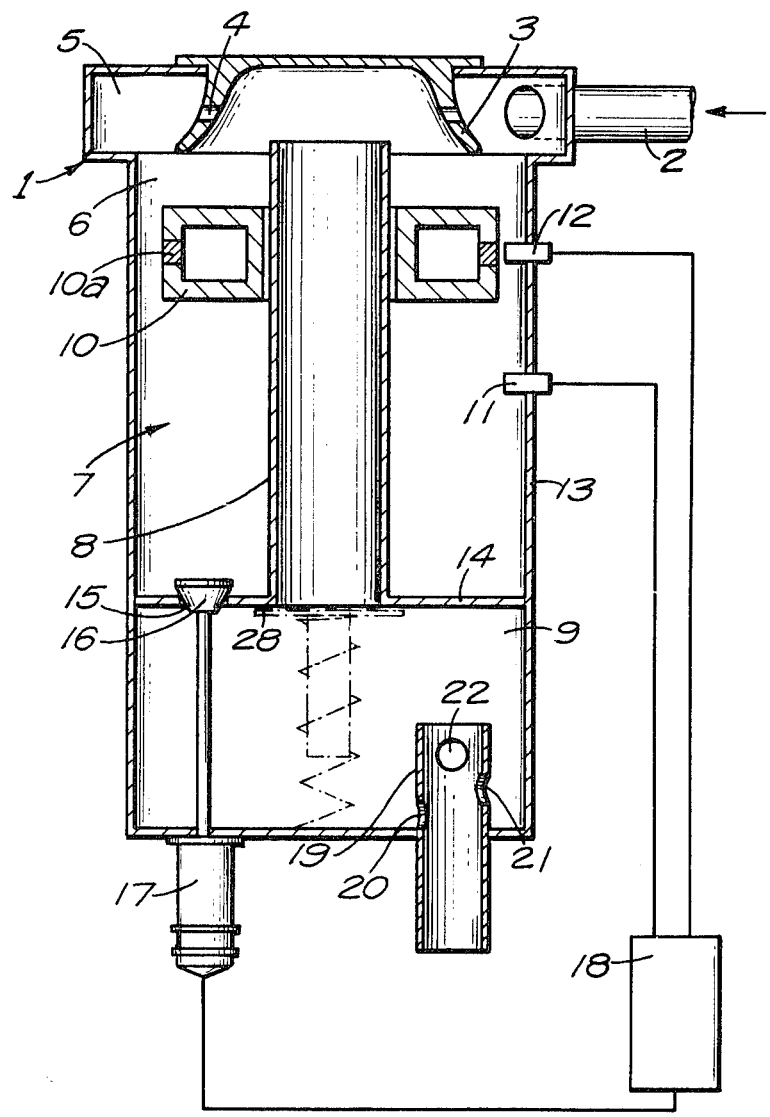
FIG. 1 is a vertical section of a milk-volume meter with a collection compartment below the measurement compartment.

The milk-volume meter in FIG. 1 has a separation compartment 1 into which a fresh mixture of milk and air is supplied tangentially through a connection 2. Separation compartment 1 is provided with transport vanes 3 that contain flow-through perforations 4 for the air that separates from the mixture of milk and air while the milk fills the outer area 5 of separation compartment 1. The separated milk flows through an inlet 6, which is constantly open, into a measurement compartment 7 and the air into a collection compartment 9 through an air pipe 8.

A float 10 slides up and down on air pipe 8. Float 10 is equipped wth a permanent magnet 10a that works in conjunction with two magnet sensors 11 and 12 in the wall 13 of measurement compartment 7.

There is a milk outlet 15 in the floor 14 of measurement compartment 7 that can be closed off with a valve head 16. Valve head 16 is part of an electromagnetically activated valve 17 that is electrically connected through an electronic device 18 to magnet sensors 11 and 12. When float 10 is in contact with magnet sensor 12, valve head 16 moves into the open position. Milk will then flow out of measurement compartment 7 into collection compartment 9, into which there projects an outflow connection 19 that is connected to the milk-delivery line and that may have outflow openings 20, 21 and 22 at different heights.

The volume V of the section of measurement compartment 7 between magnet sensors 11 and 12 is smaller than the volume $V_1$ of collection compartment 9.

When milk is flowing out of measurement compartment 7 and float 10 is low enough for magnet 10a to be in contact with sensor 11, valve 17 moves into the closed position.

As described in German application No. P 20 30 161.7-52, when valve 17 is closed and measurement compartment 7 is filling, magnet sensors 11 and 12 or a similar device measure the time $c_i$ taken by float 10 to travel from the lower to the upper sensor. Volume V of measurement compartment 7 becomes occupied during this time. When float 10 arrives at upper sensor 12, valve 17 opens and unblocks milk outlet 15 until the float returns, during time $d_i$, to lower sensor 11, when valve 17 will close again and float 10 start to rise again.

The equation $Q_i = V/c_i$ represents the mean flow during time $c_i$.

If flow $Q_i$ is constant over time $d_i$, the volume flowing in during time $b_i = c_i + d_i$ (FIG. 2) will be $$V_i = Q_i \times b_i = \frac{b_i}{c_i} \times V.$$

In n measurements an overall volume of $$Q_{tot} = \sum_{i=1}^{n} V_i = V \times \sum_{i=1}^{n} \frac{b_i}{c_i}.$$

will be obtained.

Figure 2:
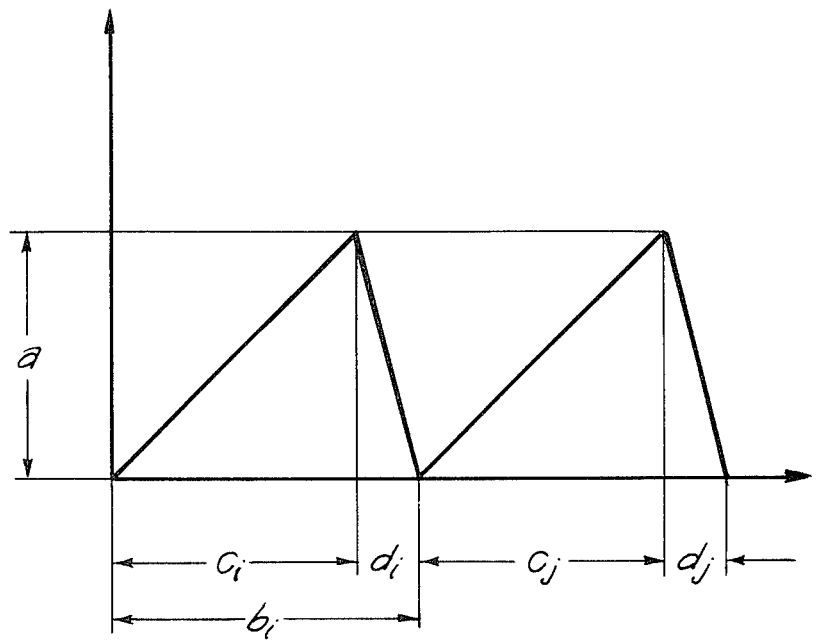
FIG. 2 is a graph demonstrating how the milk-volume meter specified in the known meter operates.

From FIG. 2, which is a graph demonstrating how the milk-volume meter of application No. P 20 30 161 operates, it will be evident that the time $b_i$ of one measurement interval is the sum of the filling time $c_i$ and of the opening time $d_i$ of valve 17. The end of the measurement interval always coincides with the end of the opening time of one measurement interval.

To increase the measurement precision of the milk-volume meter, the filling time or times for the milk-volume meter in accordance with the present invention are shifted, as illustrated by the graphs in FIGS. 3 through 6, to the middle of the measurement interval.

Figure 3:
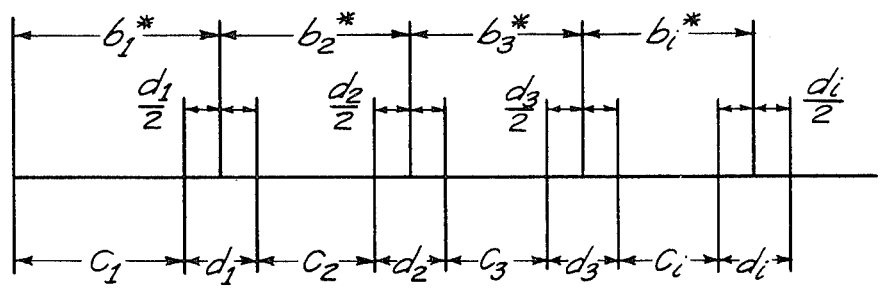
FIGS. 3 through 6 are graphs demonstrating different ways in which the milk-volume meter in accordance with the present invention operates.

In operation illustrated in FIG. 3, total volume $Q_{tot}$ is obtained from the formula $$Q_{tot} = V \sum_{i=1}^{n} \frac{b_i^*}{c_i} \text{ where } b_1^* = c_1 + \frac{d_1}{2} \text{ and}$$

$$b_i^* = \frac{d_{i-1}}{2} + c_i + \frac{d_i}{2} \text{ for } i = 2, 3, \ldots$$

Figure 4:
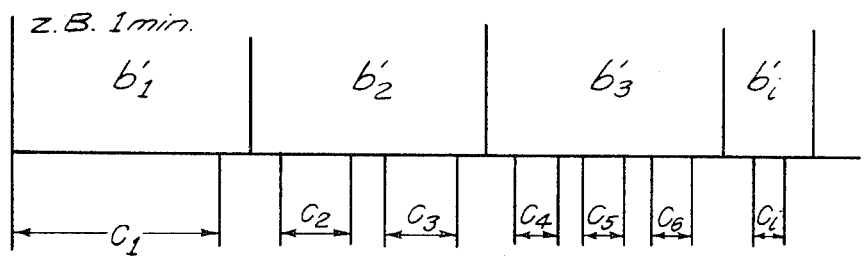

FIG. 4 shows another example of how total volume $Q_{tot}$ can be determined. In this case time $b_i'$ is not measured but predetermined. Such a time $b_i'$ may be 1 minute for example. The mean inflow in l/min is known from measuring filling time $c_i$. If the filling volume V of measurement compartment 7 is small, many measurements will normally occur at short intervals of time. If a predetermined time $b_i'$ is employed, the inflow values measured during this time can be replaced with a mean value. The volume for time $b_i'$ can then be determined from this mean.

Total volume is determined from the formula $$Q_{tot} = V \sum_{i=1}^{n} \frac{b_i'}{c_i}$$

Figure 5:
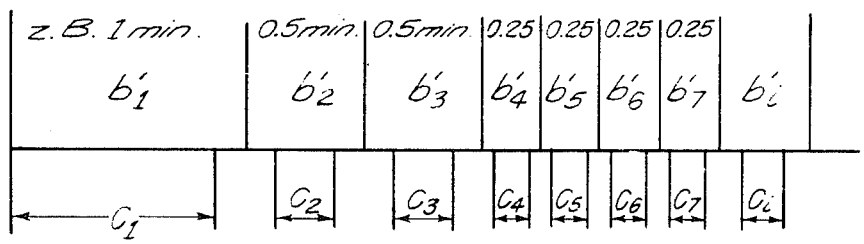

It is, however, also possible to make the time $b_i'$ of one measurement interval depend on the associated filling time $c_i$. This mode of operation is illustrated in FIG. 5. The more measurements of $c_i$ per unit of time, the shorter $b_i'$ can be. At 2 measurements per minute $b_i'$ can be 0.5 minutes and at 4 measurements per minute it can be 0.25 minutes.

Figure 6:
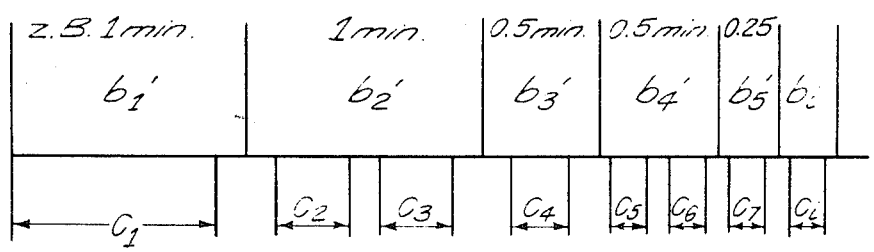

In the mode of operation illustrated in FIG. 6 the time of measurement interval $b_i'$ depends on previously obtained measurement results. The first measurement is obtained during a predetermined time $b_i'$ that may for example be 1 minute. The length of the following measurement intervals depends on the number of filling processes in the preceding measurement interval. When two filling processes occur in the preceding measurement interval the time of the next interval can be cut in half.

It will be appreciated that the instant specification and claims are set forth by way of illustration and not limitation, and that various modifications and changes may be made without departing from the spirit and scope of the present invention.

What is claimed is:

1. In a method for directly measuring the quantity of milk obtained from a cow being milked by a mechanical milking apparatus, including vacuum separating milk from a milk-air mixture from a cow, continuously freely feeding the separated milk to a measuring chamber, sensing the level of the milk in the measuring chamber at a first level from the bottom thereof, discharging the milk from the measuring chamber through a valved outlet by opening same when the level of the milk in the measuring chamber reaches said first level and determining the quantity (Q) of milk from partial volumes during a plurality of measurement intervals ($b_i$) during the flow of milk into and out of the measuring chamber, the improvement comprising:

sensing the level of the milk in the measuring chamber at a second level below said first level;

measuring the time ($c_i$) it takes to fill the measuring chamber from the second level to the first level;

closing the valved outlet when the milk is at the second level;

defining each measurement interval ($b_i$) as including at least one filling time ($c_i$) and one segment of the time ($d_i$) during which the valved outlet is open before the filling time ($c_i$) and after the filling time ($c_i$) and wherein the step of determining Q comprises calculating Q according to $$Q = V \sum_{i=1}^{n} \frac{b_i}{c_i}$$

where $$b_1 = c_1 + \frac{d_1}{2} \text{ and } b_i = \frac{d_{i-1}}{2} + c_i + \frac{d_i}{2} \text{ for } i = 2, 3, \ldots$$

2. The method according to claim 1, wherein the step of measuring the filling time ($c_i$) comprises predetermining and holding constant the time ($b_i'$) of the measurement interval and calculating the total milk volume Q in accordance with the formula $$Q = V \sum_{i=1}^{n} \frac{b_i'}{c_i}.$$

3. The method according to claim 1, wherein the time $b_i$ of a measurement interval defined as a function of the results obtained during the preceding measurement interval.

* * * * *